United States Patent
Krüger

(10) Patent No.: US 9,952,688 B2
(45) Date of Patent: Apr. 24, 2018

(54) GENERATING AN INPUT COMMAND

(71) Applicant: SIEMENS AKTIENGESELLSCHAFT, München (DE)

(72) Inventor: Thorsten Krüger, Warngau (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 15/033,666

(22) PCT Filed: Nov. 10, 2014

(86) PCT No.: PCT/EP2014/074186
§ 371 (c)(1),
(2) Date: May 2, 2016

(87) PCT Pub. No.: WO2015/113663
PCT Pub. Date: Aug. 6, 2015

(65) Prior Publication Data
US 2016/0328034 A1    Nov. 10, 2016

(30) Foreign Application Priority Data
Jan. 31, 2014   (DE) .................. 10 2014 201 794

(51) Int. Cl.
*G06F 3/038* (2013.01)
*G06F 3/0346* (2013.01)
(Continued)

(52) U.S. Cl.
CPC .......... *G06F 3/03547* (2013.01); *G06F 3/038* (2013.01); *G06F 3/0488* (2013.01);
(Continued)

(58) Field of Classification Search
CPC .................. G06F 3/014; G06F 3/01
See application file for complete search history.

(56) References Cited

U.S. PATENT DOCUMENTS

| | | | |
|---|---|---|---|
| 7,109,970 B1 | 9/2006 | Miller | |
| 7,192,387 B2 * | 3/2007 | Mendel | A63B 24/00 434/247 |

(Continued)

FOREIGN PATENT DOCUMENTS

| | | |
|---|---|---|
| DE | 102008014199 A1 | 9/2009 |
| EP | 2587345 A2 | 5/2013 |

(Continued)

OTHER PUBLICATIONS

International Search Report; PCT/EP2014/074186; International Filing Date: Nov. 10, 2014; 3 pgs.

*Primary Examiner* — Lixi C Simpson
(74) *Attorney, Agent, or Firm* — Schmeiser Olsen & Watts LLP

(57) ABSTRACT

An arrangement for generating an input command having two essentially ring-shaped input elements which are spatially separate from each other, for securing to respectively a hand is provided. A processing unit for generating an input command in accordance with predefined interacting input patterns is provided. A method for generating an input command is also disclosed, wherein when an instance of touching occurs a respective input pattern is determined in at least two spatially separated input elements. An associated input command is generated from the respective input patterns as a function of input patterns which interact in a predetermined way.

12 Claims, 2 Drawing Sheets

(51) Int. Cl.
*G06F 3/0354* (2013.01)
*G06F 3/0488* (2013.01)

(52) U.S. Cl.
CPC .. *G06F 3/04883* (2013.01); *G06F 2203/0331* (2013.01); *G06F 2203/0382* (2013.01); *G06F 2203/0384* (2013.01)

(56) References Cited

U.S. PATENT DOCUMENTS

| | | | | |
|---|---|---|---|---|
| 2004/0263473 A1* | 12/2004 | Cho | ............... | G06F 3/014 |
| | | | | 345/156 |
| 2005/0052412 A1* | 3/2005 | McRae | ............ | A63F 13/06 |
| | | | | 345/158 |
| 2009/0251407 A1* | 10/2009 | Flake | ............... | G06F 3/014 |
| | | | | 345/156 |
| 2011/0007035 A1* | 1/2011 | Shai | ............... | G06F 3/014 |
| | | | | 345/179 |
| 2011/0148669 A1 | 6/2011 | Kang et al. | | |
| 2012/0293410 A1 | 11/2012 | Bell | | |
| 2014/0365979 A1* | 12/2014 | Yoon | ............... | G06F 3/017 |
| | | | | 715/863 |
| 2014/0368447 A1* | 12/2014 | Saini | ............... | G06F 3/1423 |
| | | | | 345/173 |

FOREIGN PATENT DOCUMENTS

| KR | 20110069503 A | 6/2011 |
|---|---|---|
| NL | 1018577 C2 | 1/2003 |
| WO | WO 2005027356 A2 | 3/2005 |

\* cited by examiner

GENERATING AN INPUT COMMAND

CROSS-REFERENCE TO RELATED APPLICATIONS

This application claims priority to PCT Application No. PCT/EP2014/074186, having a filing date of Nov. 10, 2014, based off of DE Application No. 102014201794.7 having a filing date of Jan. 31, 2014, the entire contents of which are hereby incorporated by reference.

FIELD OF TECHNOLOGY

The following relates to an arrangement and to a method for generating an input command.

BACKGROUND

In the field of entertainment electronics as well as in the field of industrial automation which is assisted by mobile communication devices, touch-sensitive surfaces are frequently used as user interfaces, for example between man and machine. For example, smart phones or tablets frequently have what are referred to as touchpads or entire touch displays. In particular, inputs are carried out with the hand or with a finger or a plurality of fingers by means of the touch-sensitive areas. In this context, the touchpad can be determined solely for the purpose of inputting a gesture. In this context, capacitive, resistive and inductive methods are used for determining an input gesture. In addition, screens or displays are used as combined input devices and output devices in that the screen surface is configured in a touch-sensitive fashion. Moreover, tablet PCs or smart phones make widespread use of multitouch gestures. Here, capacitive methods are particularly widespread.

In order to perform operator control of touch-sensitive user interfaces, the user requires physical access to the touch-sensitive area. In the industrial environment, it is, however, in some cases desirable not to permit direct physical access to a device, for example a control computer of an industrial control system, or to permit only restricted access. It may therefore be advantageous, for example, to install a device at which an input is to be carried out in an inaccessible location. In addition, the device may for example be stored inaccessibly in a pocket or a case during a working step.

It is known from the prior art to provide input devices such as, for example, a mouse or a touchpad or a sensor for sensing gestures, externally. A device is actuated by means of these external input devices.

It is also known to attach a device with an actuatable pushbutton knob to a body part, such as, for example, a finger. A device for a smart phone is known for this purpose from the company Ringbow.

Against this background, an aspect is to generate an input command for a device.

SUMMARY

The following relates to an arrangement for generating an input command, comprising at least two essentially annular input elements which are spatially separated from one another and are intended for attachment to one hand each, in particular to a finger, wherein the input elements each comprise touch-sensitive regions by means of which a respective input pattern can be determined when they are touched;

a processing unit for generating an input command from the respective input patterns as a function of input patterns which interact in a predetermined way.

The arrangement implements a user interface by means of which an input command is generated in a particularly secure and comfortable way. An input command is assigned to a combination of respective input patterns using the input pattern which interacts in the predetermined way. An effect or an action which is intended by means of the combined input is therefore predefined for a combination.

For example, a first input pattern can be determined when a first instance of touching is made with a first touch-sensitive region of a first input element. The first input element is attached here to a first hand, for example to a finger such as the index finger of the first hand. At least a second input element is associated with the arrangement for generating the input command. The second input element is attached, for example, to a second hand or to the same hand as the first input element, that is to say to the first hand. If it is attached to the first hand, it is attached, for example, to the same finger as the first input device or to a further finger of the first hand, in particular the middle finger, ring finger or small finger. If it is attached to a second hand, the second input element is, for example, attached to an index finger of the second hand, in a way which is analogous to the first input element.

The respective input elements are configured in an essentially annular shape. In this context, essentially means, for example, that the input element is shaped ergonomically with respect to the configuration of a human hand or of a finger, and at the same time can have a deviation from the symmetrical circular shape in cross section.

The hand here is, in particular, a human hand or a robot hand which can be controlled using robotics controllers and which is based, in particular, on the shape of a human hand.

In each case known touchpad surfaces are used as touch-sensitive regions. These can be embodied, in particular, as a planar area or can have a curved shape as a surface. The touch-sensitive regions are configured here in such a way that they can evaluate instances of touching respectively caused by a hand or a finger or instances of touching caused by a plurality of fingers of a hand or instances of touching caused by a plurality of fingers of different hands. Therefore, in each case a touch-sensitive interface, or correspondingly a multi-touch-sensitive interface, is made available at the touch-sensitive regions of the respective input elements.

In particular, the instance of touching at the touch-sensitive region is generated using the thumb of the hand to which the respective input device is attached. In particular, the instance of touching is carried out with the respective thumb of the respective hand at at least two input devices which are each attached to a different hand.

For example, for the input pattern raw information is determined which contains data about an absolute or relative position value of an instance of touching or a chronological profile of registered instances of touching as a function of or independently of a relative or absolute position within the touch-sensitive region. Therefore, a raw data set is produced if an instance of touching is registered.

A selection or marking of objects on a screen can be brought about by means of a conventional mouse as an input element or by means of an input command on a keypad or keyboard. In the case of touch-sensitive surfaces, the corresponding input is possible by means of a simple, brief instance of touching. The input pattern on the touch-sensitive region is then correspondingly a single instance of touching within a specific time period.

The instance of touching can be evaluated independently of a position on the touch-sensitive region, or as a function of the absolute position on the touch-sensitive region. For example, an instance of touching is evaluated only if it takes place in a predefined portion of the touch-sensitive region. This portion may be fixed, in particular for any desired display on a screen of a device which is to be controlled by means of the input, or may vary depending on the input which is to be executed, i.e., depending on the program which is currently being run on the device. For example, an input is always to be made within a central portion on the touch-sensitive region if a "selection" command is to be made by means of a single brief instance of touching. "Selection" command can mean here, for example, that a parameter needs to be selected from a multiplicity of parameters. In one further variant, confirmation of an action is to be carried out: only if the input takes place in an outer or defined portion of the touch-sensitive region is it possible to input the confirmation, for example to start an action, by a single brief instance of touching.

In order to determine the respective input pattern, it is additionally possible to analyze a registered movement sequence on a respective input element by means of an evaluation unit, and to carry out an assignment to a movement class. Therefore, in particular a registered chronological and spatial movement sequence can be detected as a gesture and evaluated. Correspondingly, a raw data set of a detected instance of touching or a data set which is derived therefrom and which already constitutes a classification of the registered movement in a movement class, and therefore comprises evaluation of the detected instance of touching, is made available as a movement pattern to the processing unit. In addition, mixed forms thereof can be determined as input patterns by the input element carrying out parts or individual steps of an evaluation of the detected instance of touching.

The arrangement also comprises the processing unit for generating the input command. For this purpose, the processing unit is provided with the respective input pattern of the respective input element. In addition, the processing unit is provided with information about input patterns which interact in a predefined way. For example, a list indicating to which combinations of input patterns an associated input command is assigned is stored in a memory area of the processing unit. For example, the processing unit is provided with a list in which possible combinations of the first input pattern with the second input pattern are listed. The generation of the input command therefore takes place on the basis of the input patterns which interact in a predetermined way, as a function of the respective currently registered input patterns which are made available to the processing unit, for example, by one or more input devices.

The processing unit has here at least one communication interface via which the respective input patterns are received.

In order to generate the input command, a processor, such as for example a microprocessor or a main processor unit or an FPGA, which is installed in the processing unit, can be provided. In particular, the processing unit has a plurality of communication interfaces, wherein a respective communication interface is configured for communication with a respective input element.

According to one configuration, the processing unit is embodied integrated into one of the input elements. Therefore, in particular an individual input element can be equipped with a high computing power and therefore perform, on the one hand, the function of making available a user interface for determining the respective input pattern and, on the other hand, the function of generating the input command. Therefore, the arrangement can be implemented externally with respect to a device which is intended to be able to access the input command. In particular, the input command controls a device or configures a system.

The inputting and the processing of an input pattern for generating the input command are therefore carried out, for example, outside a device and therefore independently of possible access to a device. In particular, physical access to the device is not necessary for the successful generation of an input command. Moreover, the availability of the device in a communication network or an existing communication connection between the arrangement and the device is also not necessary for the successful generation of the input command. If the device is, for example, not switched on or a communication connection between the arrangement and the device is not possible, the input command can nevertheless be generated using the arrangement and can, for example, be made available at a later time at which the device can be accessed by the arrangement.

According to one configuration, the processing unit is arranged in a computer. The computer can be provided especially for the processing unit here or can be provided for further computing steps or processing steps within a system. It is therefore advantageously possible to carry out adaptation to or full utilization of existing computing capacities. The implementation of the processing unit in a computer advantageously permits the design of the respective input elements to be kept as small as possible. The respective input elements can therefore be implemented with a low weight and can be conveniently carried in one hand or attached thereto.

According to one configuration, the processing unit is arranged in a mobile or permanently installed device which can be controlled by means of the input elements. Therefore, a device which is controlled by means of the proposed arrangement using inputs is configured in such a way that the processing unit is implemented thereon. Therefore, the input patterns which are determined by means of the input elements are processed in the device which is to be operated or controlled or configured by the input. This is advantageous, in particular, if the arrangement is already provided at the time of installation of the device, or the processing unit can be added to the device, for example in a maintenance phase. In addition, this is advantageous if the processing unit is to be protected in a particular way against tampering or misconfiguration, in particular owing to safety requirements or security requirements. In such cases, the possibility of simple access to the processing unit or simple exchange thereof may not be desired.

According to one configuration, the respective input elements have at least one respective interface for communicating with the processing unit and/or with one another. For example, the first input element has a first interface for communicating with the processing unit, and the second input element has a second interface for communicating with the processing unit. In a further configuration, the first input element has a first interface for communicating with the second input element, and the second input element has a second interface for communicating with the processing unit. A communication connection can therefore be advantageously adapted, in particular by selecting different types of transmission for different transmission paths within the arrangement. In this context, it is possible to choose individually for each transmission path either cable-bound transmission or cableless transmission and in turn choose between different wireless personal area network structures or, in the abbreviated form WPAN structures, such as Bluetooth or ZigBee.

According to one configuration, respective interfaces are embodied as wireless interfaces or as cable-bound interfaces. Depending on the requirements made of the input elements, wireless transmission can be selected by means of the wireless interfaces, with the result that the input elements are carried in a simple, safe and comfortable way by a user in a hand or in both hands without his mobility, for example within an industrial installation, being restricted thereby. Depending on the industrial environment, a cable-bound transmission path can advantageously be selected by means of the cable-bound interfaces, for example if a WPAN or wireless local area network (abbreviated as WLAN)-based communication method can cause interference, or can itself suffer interference, owing to existing fields.

According to one configuration, at least one of the input elements has an energy accumulator as an internal voltage source, for example a battery. A high level of mobility of the user who carries the input elements, for example in his hand, is possible and nevertheless the voltage supply of the input elements is ensured for a predefined time.

According to one configuration, at least one of the input elements is configured with an evaluation unit for evaluating instances of touching and for determining input patterns. For example, only one of the input elements is equipped with an evaluation unit which permits the evaluation of detected raw data on the basis of registered instances of touching of the touch-sensitive region. The input element which is equipped with the evaluation unit therefore determines, for example, as a second input element, a second input pattern as a function of sensed instances of touching of the second touch-sensitive region of the second input element. A first input element can have, for example, less computing capacity and can transmit acquired raw data on an instance of touching at the first touch-sensitive region for evaluation to the second input element whose evaluation unit then not only determines the second input pattern but also the first input pattern.

The following also relate to a method for generating an input command, wherein
  when an instance of touching occurs a respective input pattern is determined in at least two spatially separated input elements;
  an associated input command is generated from the respective input patterns as a function of input patterns which interact in a predetermined way.

The presented method permits the inputting of a multiplicity of commands relating to the use of two input elements whose inputs interact in a predefinable way. A combination of movement patterns which occur is assigned a significance by the generation of the input command, which significance goes beyond the customary possibilities of defining the significance of a touch gesture, for example on an individual touchpad.

The instance of touching of the at least two input elements which are spatially separated from one another is carried out here, for example, by a hand or a finger of a hand. It is therefore possible for a user to make an input at the respective input element. Depending on the input element it is possible to use, for example, a respective hand, i.e. for example a first hand for a first input element, for example a user's right hand, and a second hand, for example a user's left hand, for a second input element. When more than two spatially separated input elements are used, for example, a single hand of a user is used for inputting at a plurality of input elements, or a plurality of users can make an input at one or more input elements with their respective hand or their respective two hands. In particular, the instance of touching of a respective input element is carried out by means of a thumb, wherein a touch-sensitive region of an input element can be attached to an index finger, middle finger, ring finger or small finger or to the middle of the hand in such a way that the touch-sensitive region is oriented toward the thumb and therefore inputting by means of the thumb is more easily possible.

According to one configuration, the input command is generated as a function of an assignment rule, wherein the assignment rule assigns an input command to a combination of input patterns.

The assignment rule is advantageously embodied in a configurable fashion here and can be adapted, for example, to requirements of the field of use or to the use of the input command or to the user's preference. Depending on the configuration of the input pattern, the assignment rule can be configured to be as complex as desired. The input patterns are present, for example, in the form of an individual input command for each input element, i.e. for example an "open" individual input command is present in the first input element on the basis of a registered double click by briefly touching a first touch-sensitive region of the first input element twice in succession. The assignment rule is then generated, for example, from a list in which all the possible combinations of a registered "opening" individual input command are listed at one of the input elements with all the possible individual input commands which can be registered at the other input elements which are present.

In the case of a fine-grained assignment rule, in particular the chronological relation of input patterns at the different input elements is taken into account. It is therefore possible, for example, to specify a tolerance range within which a respectively registered instance of touching is considered to have taken place simultaneously. The possibility of staggered timing with which an movement pattern is sensed can be used intentionally to open up further combination possibilities. For example, the double clicking on a first input element with a double click on a second input element in chronological succession can be assigned to another input command than the simultaneous double clicking on both input elements. The absolute value of the time offset, that is to say for example a value in seconds, can also be taken into account.

In one configuration, the respective input pattern is determined by means of respective touch-sensitive regions of the input elements, and made available at a respective interface of the input elements.

By using the techniques described above for determining an instance of touching by, for example, a human hand and for evaluating such an instance of touching in order to determine a touch gesture, a multi-touch function is advantageously made available by means of a plurality of input elements. In addition to the possibility of a multi-touch input on a touch-sensitive region, such as can be implemented in the proposed method, the inputt of a multi-touch gesture by means of a respective single touch gesture as a respective input element is also made possible.

According to one configuration, the respective input pattern is received by means of a processing unit, and the input command is generated by the processing unit. Depending on the configuration of the input elements used, the generation of the input command can be shifted to an external unit, the processing unit. It is therefore possible, in particular, to distribute resources in an optimum way and to configure the input elements in a user-friendly way. The input command can be generated, in particular, in such a way that it can be made available from the processing unit and can be used directly for processing by means of a device at which the input is to be implemented.

According to one configuration, in order to determine the respective input pattern a chronological profile and/or spatial profile of an instance of touching of the respective touch-sensitive regions is determined. By means of capacitive or resistive touch measuring techniques it is therefore possible, for example, to calculate an absolute position of an instance of touching of the touch-sensitive region. It is possible to sense a chronological profile of following instances of touching on the basis of the starting position. In particular, in each case the information about an absolute position can be registered for this on, for example, the touchpad. Alternatively, merely the relative profile of an instance of touching can be determined on the basis of chronologically successive touching for detecting a gesture. In particular, timing information can be recorded by the input element by means of a real-time clock, for example, which timing information can be related to an input pattern of a second input element or further input element which also contains timing information.

According to one configuration, a respective individual input command is determined by means of an evaluation unit of at least one input element on the basis of a respective chronological and/or spatial profile of an instance of touching of the respective touch-sensitive regions of at least one input element.

Depending on the configuration of the input elements, evaluation of the instance of touching of the respective touch-sensitive regions is therefore already carried out by the evaluation unit of the input element. An evaluated data set is then already made available as an input pattern. In this way, in particular error detection measures can already be carried out by the evaluation unit and therefore already by the input element. Software which is already implemented for evaluating instances of touching on touch-sensitive surfaces can therefore be advantageously used. In such a configuration, the processing unit only determines the present combination of input patterns and generates the input command in accordance with the assignment rule.

According to one configuration, at least one first input pattern, which can be determined at a first input unit, is transmitted to a second input unit, and a second input pattern, which can be determined at the second input unit, and at least the first input pattern are made available by means of an interface of the second input unit.

BRIEF DESCRIPTION

Some of the embodiments will be described in detail, with reference to the following figures, wherein like designations denote like members, wherein.

DETAILED DESCRIPTION

Figure 1:
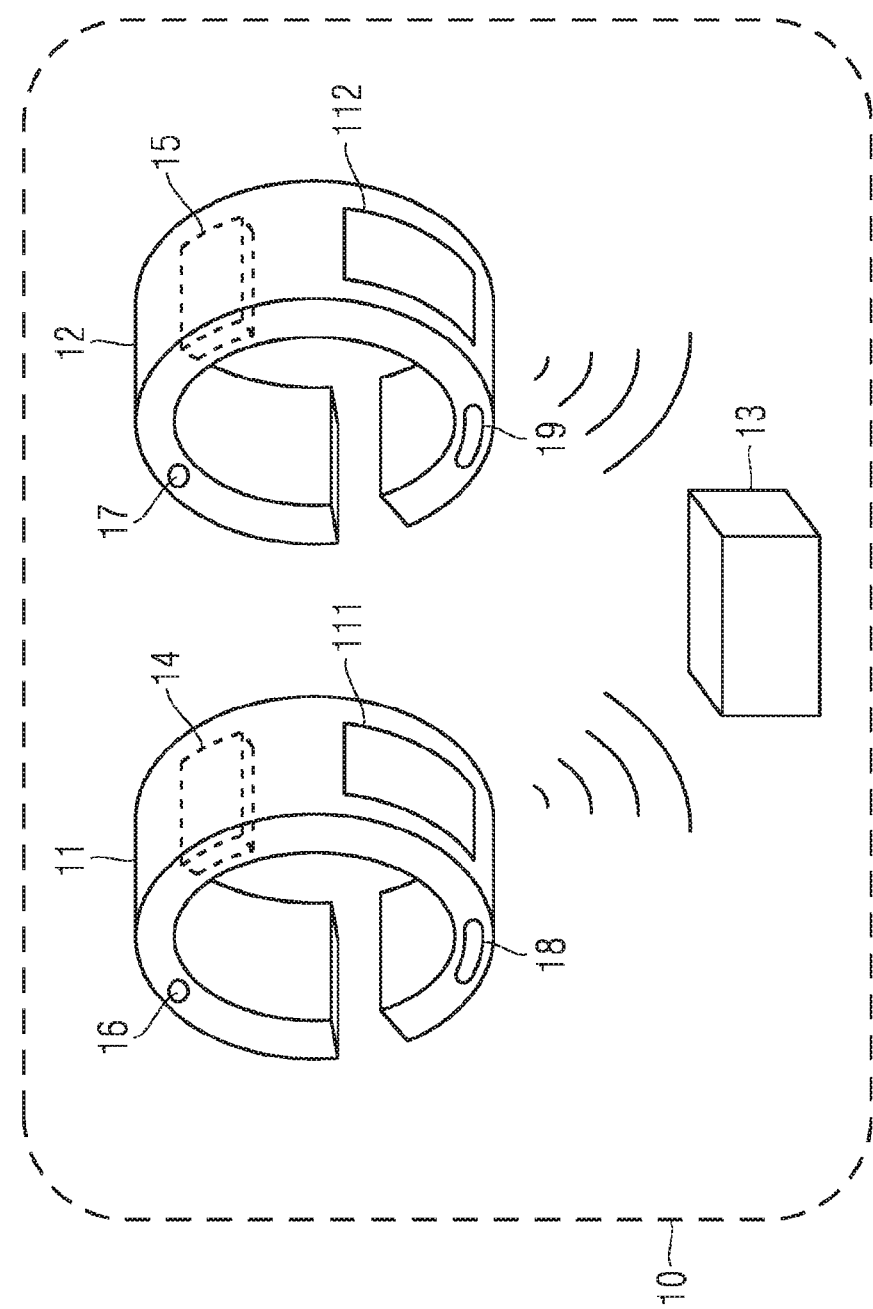
FIG. 1 shows a schematic illustration of an arrangement for generating an input command according to an exemplary embodiment of the invention.

FIG. 1 shows a schematic view of an arrangement 10 for generating an input command 3 according to an exemplary embodiment of the invention, comprising two essentially annular input elements which are spatially separated from one another, specifically a first input element 11 and a second input element 12.

In addition, a processing unit 13 is illustrated. The two input elements 11, 12 are both configured in the form of a ring which is approximately 1 cm to approximately 5 cm wide and can be carried in a human hand. The ring is, for example for the sake of simpler handling, not closed but rather has a gap according to FIG. 1. As a result, various ring sizes can be formed if a correspondingly pliable material is used for the basic structure of the ring. Alternatively, various ring sizes can be set. Alternatively, the ring can also be closed.

The touch-sensitive region 111 of the first input element 11 is provided on an outer side of the ring which is accessible to other fingers of the same hand on which the ring is also worn or for fingers of a further hand or, in particular, for the thumb of the hand on which the ring is worn. Said region 111 is, for example, a rectangular region which extends over the width of the annular input element 11 and covers in length, for example, a quarter up to half of the outer circumference of the annular input element. All the further sizes for the touch-sensitive region are advantageous configurations depending on the application. The touch-sensitive region 111 is here, in particular, curved in the longitudinal direction and therefore has the shape of an arcuate disk or of an annular segment. If the ring is worn on the index finger of a hand, advantageous inputting using the thumb of the same hand is therefore possible.

The second input element 12 is embodied, in particular, in a mirror-inverted fashion with respect to the first input element 11 and has the characteristic touch-sensitive region 112 which is configured in the same way. An evaluation unit 14 is provided within the input elements 11, 12. Said evaluation unit 14 is implemented as a computing chip or computer chip and carries out the evaluation or interpretation of the gestures sensed at the touch-sensitive regions. In particular Bluetooth chips serve as respective interfaces 18, 19, and are suitable for communicating with the processing unit 13. Respective batteries are integrated into the input elements 11, 12 and can be connected to a voltage source via a respective charging connection 16, 17 and charged.

The processing unit is installed in the device itself for which the inputting of a gesture is to be made by means of the two input elements 11, 12. The device is connected to a temperature regulating system, for example within an industrial installation for analyzing a fabrication process, in order to carry out maintenance steps such as, for example, tests, or to download a safety update. For this reason, it is installed with spatially poor access, with the result that, in particular, input interfaces which are possibly provided on the device are not freely accessible to the user or the maintenance technician. By means of the input elements 11, 12 which have been described, it is advantageously possible to input a gesture such as, for example, a multi-touch gesture. Providing the input patterns 1, 2 via the Bluetooth transmission path makes convenient cableless movement of the maintenance technician around the system possible. The transmission method used, such as in this case the Bluetooth technology, can be adapted to the conditions of the field of use. Generally, short-range radio technology can be used by means of wireless personal area networks, known for short as WPAN.

In the exemplary embodiment illustrated, inputting into the maintenance device, for example mobile tablet, is carried out in a safe and comfortable way. It is possible here to carry out navigation within a maintenance tool by means of the gestures which can be input. In this context, so-called scrolling, which brings about scrolling within a document by means of gestures, can make it possible, for example, to scroll through a list of values which are displayed on the tablet. Commands, such as the printing out of test reports or the enlargement of what is displayed on the display unit of the tablet PC can be generated.

Figure 2:
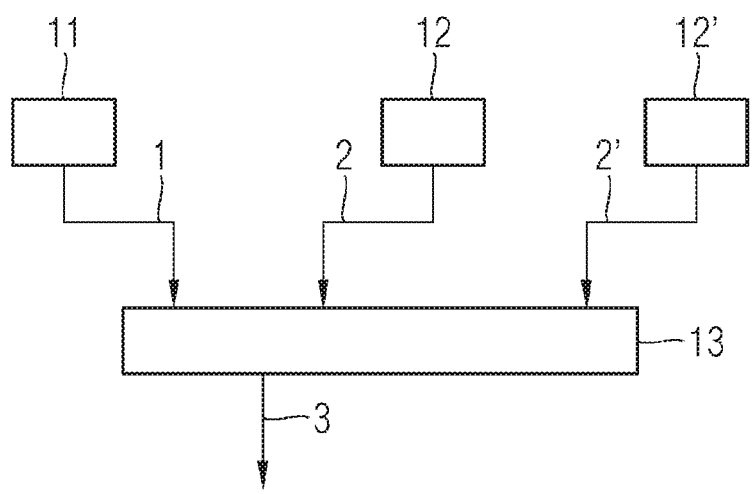
FIG. 2 shows a schematic illustration of a method for generating an input command according to a further exemplary embodiment of the invention.

A schematic method for generating an input command 3 is illustrated in FIG. 2. A first input element 11 and a second input element 12 as well as a third input element 12' determines a first input pattern 1, a second input element 2 and a third input element 2'. A processing unit 13 receives the respective input patterns 1, 2, 2' and determines the input command. In this context, the processing unit 13 is configured to be configurable and therefore it is possible to change or configure the assignment rule which the processing unit applies. During the configuration of the processing unit 13 it is defined, for example, for which combination of respective input patterns 1, 2, 2' input command 3 results. In addition, it is possible to define here which input patterns 1, 2, 2' occur together or in succession in a definable time period, so an instance of touching is evaluated as being valid and an input command is generated. In particular, it is possible to define here that two of the input elements 11, 12, 12' have to be touched at a respective touch-sensitive region or a respective touch field in order to generate an input command, i.e. a respective input pattern 1, 2, 2' must be present for an input command to be generated. This can be, in particular, in the case of safety-critical industrial installations a requirement to categorize a gesture as having been input intentionally and not inadvertently. In addition, the meaning of a combination of respective input patterns can be defined by means of the configuration. For example, a punctiform instance of touching is evaluated as an individual click for marking an object, or touching twice as a double click for selecting a marked object. In addition, gestures such as the wiping over the touch-sensitive region in a predefined direction can be defined here as scrolling up or scrolling down.

The presented method makes available an engagement-free, easy to install and quasi hands-free input possibility for a device which is to be controlled by means of the input.

The invention claimed is:

1. An arrangement for generating an input command, comprising
    a first and second essentially annular input elements which are spatially separated from one another and are arranged for attachment to one hand each, wherein the first and second essentially annular input elements each comprise touch-sensitive regions whereby respective input touch patterns can be determined when the touch-sensitive regions of the first and second essentially annular input elements are touched, the first essentially annular input element configured to collect raw data of a first input touch pattern and the second essentially annular input element configured to collect raw data of a second input touch pattern; and
    a processing unit for generating an input command from the respective input touch patterns as a function of input touch patterns which interact in a predetermined way, wherein the processing unit is external to the first and second essentially annular input elements;
    wherein the second essentially annular input element is configured with an evaluation unit for evaluating instances of touching and for determining the respective input touch patterns;
    wherein raw data of the first input touch pattern collected at the first essentially annular input element is transmitted to the second essentially annular input element;
    wherein at least one of the raw data of the first input touch pattern and the raw data of the second input touch pattern is evaluated by the evaluation unit on the second essentially annular input element and is made available as the first input touch pattern or the second input touch pattern respectively by an interface of the second essentially annular input element; and
    further wherein the processing unit receives at least one of the first input touch pattern and the second input touch pattern from the second essentially annular input element and generates the input command.

2. The arrangement as claimed in claim 1, wherein the processing unit is embodied integrally into one of the first and second essentially annular input elements.

3. The arrangement as claimed in claim 1, wherein the processing unit is arranged in a mobile or permanently installed device which can be controlled by the first and second essentially annular input elements.

4. The arrangement as claimed in claim 1, wherein the first and second essentially annular input elements have at least one respective interface for communicating with at least one of the processing unit and with one another.

5. The arrangement as claimed in claim 4, wherein the respective interface is embodied as one of a wireless interface and a cable-bound interface.

6. The arrangement as claimed in claim 1, wherein at least one of the first and second essentially annular input elements has an energy accumulator as an internal voltage source.

7. An arrangement for generating an input command as claimed in claim 1, wherein the first and second essentially annular input elements which are spatially separated from one another are further arranged for attachment to at least one finger.

8. A method for generating an input command, comprising:
    collecting a first touch gesture by a first input element and a second touch gesture by a second input element, wherein the first and second input elements are spatially separated;
    transmitting the first touch gesture from the first input element to the second input element;
    evaluating, by an evaluation unit on the second input element, the first and second touch gestures and determining first and second input patterns from the first and second touch gestures, respectively;
    making available, to a processing unit located externally to the first and second input elements, the first and second input patterns;
    generating, by the processing unit, the input command from at least one of the first and second input patterns.

9. The method as claimed in claim 8, wherein the input command is generated as a function of an assignment rule, wherein the assignment rule assigns an input command to a combination of input patterns, the combination of input patterns including the first and second input patterns.

10. The method as claimed in claim 8, wherein at least one of the respective input patterns
    is determined by means of respective touch-sensitive regions of the first and second input elements; and
    is made available at a respective interface of the first and second input elements.

11. The method as claimed in claim 8, wherein, in order to determine at least one of the first and second input patterns, a chronological and/or spatial profile is determined for respective input pattern.

12. A system for generating an input command, comprising:
- a first essentially annular input element having a first touch-sensitive region;
- a second essentially annular input element having a second touch-sensitive region;
- an evaluation unit located in the second essentially annular input element; and
- a processing unit external to the first and second essentially annular input elements;
- wherein the first touch-sensitive region collects first raw touch data and the second touch-sensitive region collects second raw touch data;
- wherein the first raw touch data is transmitted to the second essentially annular input element;
- wherein the evaluation unit determines a first input touch pattern from the first raw touch data and a second input touch pattern from the second raw touch data; and
- wherein the processing unit receives the first and second input touch patterns and generates a corresponding input command.

* * * * *